(12) United States Patent
Shibata et al.

(10) Patent No.: US 9,110,479 B2
(45) Date of Patent: Aug. 18, 2015

(54) VOLTAGE BALANCING CIRCUIT

(71) Applicant: Toshiba Schneider Inverter Corporation, Mie-gun, Mie (JP)

(72) Inventors: Masaki Shibata, Mie (JP); Yoichi Goshi, Mie (JP)

(73) Assignee: Toshiba Schneider Inverter Corporation, Mei-gun, Mie (JP)

( * ) Notice: Subject to any disclaimer, the term of this patent is extended or adjusted under 35 U.S.C. 154(b) by 148 days.

(21) Appl. No.: 14/029,257

(22) Filed: Sep. 17, 2013

(65) Prior Publication Data

US 2014/0077773 A1  Mar. 20, 2014

(30) Foreign Application Priority Data

Sep. 18, 2012  (JP) ................................. 2012-204353

(51) Int. Cl.
*H02M 5/458*  (2006.01)
*G05F 5/00*  (2006.01)
*H02M 1/32*  (2007.01)

(52) U.S. Cl.
CPC . *G05F 5/00* (2013.01); *H02M 1/32* (2013.01); *H02M 5/458* (2013.01)

(58) Field of Classification Search
CPC ............ G05F 5/00; H02M 1/32; H02M 5/458
USPC ........... 363/48, 49, 52–53, 59–60, 66, 68, 72, 363/143; 323/225, 271, 311–316, 356, 364; 320/116, 118–121, 125, 134–136, 166
See application file for complete search history.

(56) References Cited

U.S. PATENT DOCUMENTS

| | | | | |
|---|---|---|---|---|
| 4,341,991 A | * | 7/1982 | Geboers et al. | 323/311 |
| 5,063,340 A | * | 11/1991 | Kalenowsky | 320/166 |
| 5,627,742 A | * | 5/1997 | Nakata et al. | 363/98 |
| 6,597,590 B2 | * | 7/2003 | Ikimi et al. | 363/58 |
| 6,980,451 B2 | * | 12/2005 | Odell | 363/143 |

FOREIGN PATENT DOCUMENTS

| | | |
|---|---|---|
| JP | H05-057808 | 3/1993 |
| JP | H-10-295081 | 11/1998 |
| JP | 3893103 | 12/2006 |

OTHER PUBLICATIONS

English Language Abstract and Translation for JP H-10-295081 published Nov. 4, 1998.
English Language Abstract for 2003-219555 published Jul. 31, 2003.
English Language Translation for 3893103 published Dec. 15, 2006.
English Language Abstract and Translation for JP H-05-057808 published Mar. 9, 1993.

* cited by examiner

*Primary Examiner* — Rajnikant Patel
(74) *Attorney, Agent, or Firm* — DLA Piper LLP (US)

(57) ABSTRACT

A voltage balancing circuit includes (n−1)-number of voltage stabilization circuits configured between k-th reference nodes of n-number of groups of resistances and k-th output nodes of the n-number of groups of main circuit capacitors respectively where $2 \leq k \leq n$. The k-th voltage stabilization circuit is configured in such a manner that the first transistor is connected via a first resistance to a (k−a)-th output node serving as the source node and the second transistor is connected via a second resistance further connected to a (k+b)-th output node serving as the destination node, where $2 \leq k \leq n$, $1 \leq a \leq k-1$ and $1 \leq b \leq n+1-k$.

8 Claims, 15 Drawing Sheets

| n | k | a | b | COMBINATION OF n, k, a, b |
|---|---|---|---|---|
| 3 | 2 | 1 | 1 | COMBINATION OF EITHER 3, 2, 1, 1 OR 3, 2, 1, 2 |
|   |   | 1 | 2 |   |
|   | 3 | 1 | 1 | EITHER 3, 3, 1, 1 OR 3, 3, 2, 1 |
|   |   | 2 | 1 |   |
| 4 | 2 | 1 | 1 | COMBINATION OF ANY ONE OF 4, 2, 1, 1; 4, 2, 1, 2; AND 4, 2, 1, 3 |
|   |   | 1 | 2 |   |
|   |   | 1 | 3 |   |
|   | 3 | 1 | 1 | ANY ONE OF 4, 3, 1, 1; 4, 3, 1, 2; 4, 3, 2, 1; AND 4, 3, 2, 2 |
|   |   | 1 | 2 |   |
|   |   | 2 | 1 |   |
|   |   | 2 | 2 |   |
|   | 4 | 1 | 1 | ANY ONE OF 4, 4, 1, 1; 4, 4, 2, 1; AND 4, 4, 3, 1 |
|   |   | 2 | 1 |   |
|   |   | 3 | 1 |   |
| 5 | 2 | 1 | 1 | COMBINATION OF ANY ONE OF 5, 2, 1, 1; 5, 2, 1, 2; 5, 2, 1, 3; AND 5, 2, 1, 4 |
|   |   | 1 | 2 |   |
|   |   | 1 | 3 |   |
|   |   | 1 | 4 |   |
|   | 3 | 1 | 1 | ANY ONE OF 5, 3, 1, 1; 5, 3, 1, 2; 5, 3, 1, 3; 5, 3, 2, 1; 5, 3, 2, 2; AND 5, 3, 2, 3 |
|   |   | 1 | 2 |   |
|   |   | 1 | 3 |   |
|   |   | 2 | 1 |   |
|   |   | 2 | 2 |   |
|   |   | 2 | 3 |   |
|   | 4 | 1 | 1 | ANY ONE OF 5, 4, 1, 1; 5, 4, 1, 2; 5, 4, 2, 1; 5, 4, 2, 2; 5, 4, 3, 1; AND 5, 4, 3, 2 |
|   |   | 1 | 2 |   |
|   |   | 2 | 1 |   |
|   |   | 2 | 2 |   |
|   |   | 3 | 1 |   |
|   |   | 3 | 2 |   |
|   | 5 | 1 | 1 | ANY ONE OF 5, 5, 1, 1; 5, 5, 2, 1; 5, 5, 3, 1; 5, 5, 4, 1; AND 5, 5, 4, 1 |
|   |   | 2 | 1 |   |
|   |   | 3 | 1 |   |
|   |   | 4 | 1 |   |

6 AND MORE NUMBERS ELIMINATED

FIG. 15

VOLTAGE BALANCING CIRCUIT

CROSS-REFERENCE TO RELATED APPLICATIONS

This application is based upon and claims the benefit of priority from the prior Japanese Patent Application No. 2012-204353 filed on Sep. 18, 2012, the entire contents of both of which are incorporated herein by reference.

FIELD

Embodiments described herein relate to a voltage balancing circuit.

BACKGROUND

For example, in an electrical circuit such as an inverter, load such as an electric motor is driven using a semiconductor switch after AC voltage has been converted to DC voltage by a rectifier and main circuit capacitors. The main circuit capacitors are connected in series to one another between main terminals since the circuit is required to have voltage proof against high DC voltage.

In the above-described inverter, leakage current flows through the main circuit capacitors. Since the leakage current flowing through the main circuit capacitors varies according to individual difference or temperature, voltage sharing of a plurality of main circuit capacitors changes with lapse of time, with the result of possibility that shared voltage would exceed a breakdown voltage of the main circuit capacitors. In view of the possibility, balancing resistances are generally connected between terminals of the main circuit capacitors. Since current constantly flows into the balancing resistances, mere supply of AC voltage to the device always results in a large amount of power loss. In view of this problem, it is desirable to change the number of series-connected smoothing main circuit capacitors after rectification according to AC voltage to be supplied. In this case, the breakdown voltage can be rendered higher when the number of series-connected main circuit capacitors is 3 or above but not 2.

Techniques for obtaining voltage balance have conventionally been proposed. In one proposed technique, transistor-complementary elements are connected to a midpoint of a composition of series-connected electrolytic capacitors and a midpoint of a composition of series-connected resistances is connected to a common base terminal of the transistor-complementary elements.

However, consider now a case where four or more even-numbered compositions of series-connected electrolytic capacitors are used and the adjacent compositions connected in series to each other constitute one pair. In this case, when voltage balance is to be improved between the compositions of each pair, it would be difficult to improve voltage balance between the pairs of compositions.

BRIEF DESCRIPTION OF THE DRAWINGS

FIG. 15 shows combinations of voltage stabilization circuits regarding all the embodiments.

DETAILED DESCRIPTION

Figure 1:
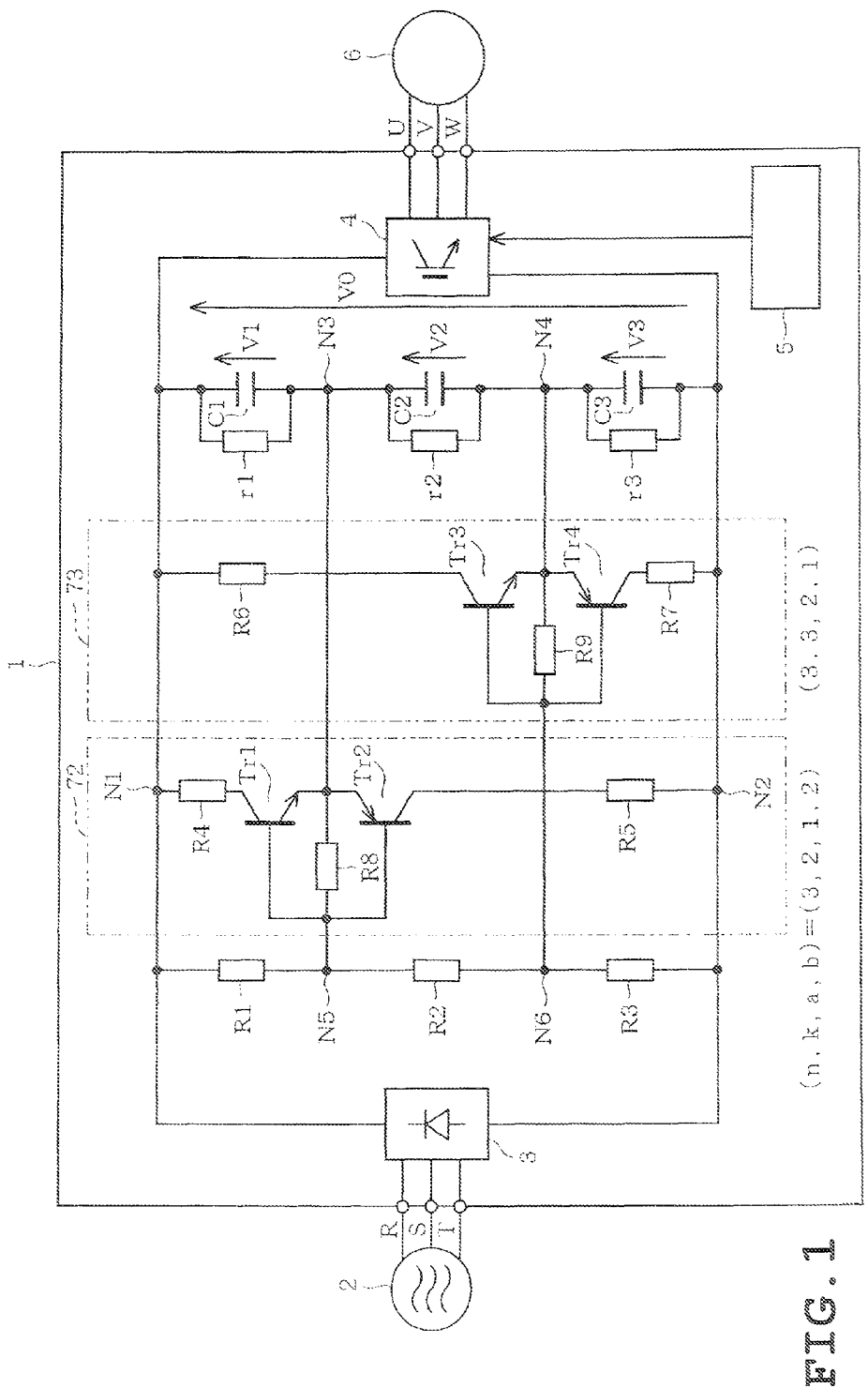
FIG. 1 is a diagram showing an electrical arrangement of an inverter device according to a first embodiment.

In general, according to one embodiment, a voltage balancing circuit includes n-number of groups of resistances series-connected between a high voltage side first reference node and a low voltage side (n+1)-th reference node, between first and second main terminals to which DC voltage is supplied, where n≥3. N-number of groups of main circuit capacitors are series-connected between the high voltage side first output node and the low voltage side (n+1)-th output node between the first and second main terminals supplying DC voltage. (N−1)-number of voltage stabilization circuits are configured between k-th reference nodes of the n-number of groups of resistances and k-th output nodes of the n-number of groups of main circuit capacitors respectively where 2≤k≤n. Each voltage stabilization circuit includes first and second transistors of first and second conductivity types opposed to each other, respectively and having commonly connected reference input terminals and commonly connected output terminals, the reference input terminals being connected to the k-th reference nodes of the n-number of groups of main circuit capacitors, the output terminals being connected to the k-th output nodes of the n-number of groups of main circuit capacitors. When voltage of each reference input terminal is higher than voltage of each output terminal, power is supplied from a source node via the first transistor to the output terminal, and when the voltage of each reference input terminal is lower than the voltage of each output terminal, power is supplied from the output terminal via the second transistor to a destination node, whereby the voltage of the output terminal is stabilized so as to correspond with the voltage of the reference input terminal. The k-th voltage stabilization circuit is configured in such a manner that the first transistor is connected via a first resistance to a (k−a)-th output node serving as the source node and the second transistor is connected via a second resistance further connected to a (k+b)-th output node serving as the destination node, where 2≤k≤n, 1≤a≤k−1 and 1≤b≤n+1−k.

Several embodiments will be described with reference to the accompanying drawings. Identical or similar parts will be labeled by the same or similar reference symbols throughout the embodiments.

A first embodiment will be described with reference to FIGS. 1 to 3D. An inverter device of AC input voltage 690 volt class is particularly exemplified in the first embodiment. The first embodiment is directed to a combination of voltage stabilization circuits configured to meet a condition, (n, k, a, b)=(3, 2, 1, 2) and (n, k, a, b)=(3, 3, 2, 1) respectively. The meaning of condition, (n, k, a, b) will be described later.

The inverter 1 includes terminals R, S and T to which a three-phase AC power source 2 is connected. A rectifier 3 is connected to the terminals R, S and T. Three-phase AC power supplied to the terminals R, S and T is further supplied to the rectifier 3, which then rectifies the input AC power. Output of the rectifier 3 is supplied to main power lines N1 and N2.

The main power line N1 serves as a first main terminal and has a node serving as a first reference node and a first output node. The main power line N2 serves as a second main terminal and has a node serving as a (n+1)-th reference node and a (n+1)-th output node. Three main circuit capacitors C1, C2 and C3 are connected in series to one another between the first and second main power lines N1 and N2. The capacitors C1 to C3 smooth output rectified by the rectifier 3, supplying DC power between the main power lines N1 and N2.

For example, two main circuit capacitors C1 and C2 may be series-connected when a three-phase AC power supply of about 400 V is used as the AC input voltage. However, when a higher power supply such as the three-phase AC power supply 2 of effective value of 690 V is used, three capacitors C1 to C3 are series-connected with the result that high breakdown voltage can easily be realized.

Three capacitors C1 to C3 are series-connected between the main power supply lines N1 and N2 in the embodiment. Each capacitor is comprised of an aluminum electrolytic capacitor. The capacitors C1 to C3 incorporate respective internal resistances r1 to r3, through each of which leakage current flows.

Individual differences occur in characteristic values such as a leakage current characteristic, a temperature characteristic and the like in the capacitors C1 to C3. As a result, voltage tends to become unbalanced according to the individual differences. Terminal voltages $V_1$ to $V_3$ in a normal operation are determined according to a ratio of capacitance values of the capacitors C1 to C3. Accordingly, capacitors having the same electrostatic capacitance value and the same breakdown voltage are used when three or more groups of capacitors are series-connected. In the following description, a node N3 serving as a second output node (k=2) will refer to a common connection point between adjacent capacitors C1 and C2, and a node N4 serving as a third output node (k=3) will refer to a common connection point between adjacent capacitors C2 and C3.

DC power smoothed by the capacitors C1 to C3 is supplied to an inverter main circuit 4. The inverter main circuit 4 converts the supplied DC power to corresponding AC power based on control signals of a control circuit 5, supplying the AC power from terminals U, V and W. The terminals U, V and W are connected to an electric motor 6 serving as load. The inverter device 1 supplies three-phase AC power via the terminals U, V and W to the motor 6. The control circuit 5 is comprised of a microcomputer, for example.

Three groups (n=3) of reference voltage generating resistances R1 to R3 are series-connected between the main power supply lines N1 and N2. The resistances R1 to R3 have the same resistance value. In the following description, a node N5 (serving as a second reference node (k=2)) will refer to a common connection point between the adjacent resistances R1 and R2 and a node N6 (serving as a third reference node (k=3)) will refer to a common connection point between the resistances R2 and R3.

Voltage stabilization circuits 72 and 73 are composed as second and third groups (k=2 and k=3) between the main power supply lines N1 and N2 respectively. The second group (k=2) voltage stabilization circuit 72 includes a resistance R4 (serving as a first resistance), an NPN transistor Tr1 (serving as a first transistor), a PNP transistor Tr2 (serving as a second transistor) and a resistance R5 (serving as a second resistance), all of which are connected in series to one another. The transistor Tr1 has a collector connected to the resistance R4 and an emitter connected to an emitter of the second transistor Tr2.

The second transistor Tr2 has a collector connected to the resistance R5.

The common emitter (serving as an output terminal) of the transistors Tr1 and Tr2 is connected to a common connection node N3 of the capacitors C1 and C2. Furthermore, the transistors Tr1 and Tr2 have respective bases connected to each other and further to a node N5, whereby the bases serve as reference input terminals. A resistance R8 is connected between the common connection node N5 of the resistance R1 and R2 and the common connection node N3 of the capacitors C1 and C2.

Furthermore, the voltage stabilization circuit 73 of the third group (k=3) includes a resistance R6 (serving as a first resistance), an NPN transistor Tr3 (serving as the first transistor), a PNP transistor Tr4 and a resistance R7 (serving as a second resistance). The transistor Tr3 has a collector connected to the resistance R6 and an emitter connected to an emitter of the transistor Tr4. The transistor Tr4 has a collector connected to the resistance R7.

The common emitter (serving as an output terminal) of the transistors Tr3 and Tr4 is connected to a common connection node N4 of the capacitors C2 and C3. Furthermore, bases of the transistors Tr3 and Tr4 connected to each other and further to a node N6, thereby serving as a reference input terminal. A resistance R9 is connected between the common connection node N6 of the resistances R2 and R3 and the common connection node N4.

The condition, (n, k, a, b) means that when n-number (n=3) of groups of reference voltage generation resistances R1 to R3 are connected, the k-th (k=2, 3) group of voltage stabilization circuits 72 and 73 is configured as follows: the first and third transistors Tr1 and Tr3 are connected via the resistances R4 and R6 to a (k−a)-th (where a=1, 2) output node (a source node) respectively, and the second transistors Tr2 and Tr4 are connected via the resistances R5 and R7 to a (k+b)-th (where b=2, 1) output node (a destination node) respectively.

The operation of the above-described configuration will now be described. In the following description, a maximum value of AC power supply voltage (=690×√2) will be defined as DC voltage $V_0$ supplied to the inverter main circuit 4. Leakage current characteristics of the capacitors C1 to C3 vary according to individual differences and temperature conditions. The individual differences in the leakage current characteristics result in different values of leakage currents of the capacitors C1 to C3 from one another. Accordingly, terminal voltages of the capacitors C1 to C3 also differ from one another, resulting in voltage unbalance. The following description of the operation is directed to the case where the leakage current of the capacitor C1 differs from the leakage currents of the capacitors C2 and C3 and accordingly, the terminal voltage $V_1$ is higher or lower than the terminal voltages $V_2$ and $V_3$ of the capacitors C2 and C3.

When the capacitor C1 has a larger leakage current than the other capacitors C2 and C3, the terminal voltage $V_1$ of the capacitor C1 drops below the terminal voltages $V_2$ and $V_3$ of the respective capacitors C2 and C3. Then, voltage at node N3 rises above a divided voltage ($2 \times V_0/3$) and voltage at node N4 also rises above a divided voltage ($V_0/3$).

Voltages at nodes N5 and N6 are divided by the respective three groups of resistances R1 to R3. Accordingly, the voltages at nodes N5 and N6 are divided voltages ($=2 \times V_0/3$, $V_0/3$) correspond to each other. However, since the voltage at the node N5 is lower than the voltage at the node N3, the transistor Tr2 is turned on when a base current flows into the transistor Tr2. In this case, the resistance R5 is set at a resistance value correspondingly proportional to a resistance value obtained by adding resistance values of two (that is, resistances R2 and R3) of the three groups of resistances R1 to R3. The resistance R4 is set at a resistance value correspondingly proportional to a resistance value of one of three resistances R1 to R3.

When each one of the reference voltage generating resistances R1 to R3 is set at 200 [kΩ] in the embodiment, the resistance R5 is set at a resistance value of 400 [kΩ] corresponding to an addition of resistance values of two groups of the resistances R1 to R3. The resistance R4 is set at a resistance value of 200 [kΩ] corresponding to the resistance value of one group of three resistances R1 to R3. Furthermore, as another example, when the resistance R5 is set at a resistance value of 100 [kΩ] corresponding to an addition of resistance values of two groups of the three resistances, the resistance R4 is set at a resistance value of 50 [kΩ] corresponding to the resistance value of one group of resistance. More specifically, a ratio of the resistance value of the resistance R4 to the resistance value of the resistance R5 is presented as 1:2, and the ratio corresponds to a resistance value ratio of the resistances of each group. These resistance value ratios of the resistances R4 and R5 are set by design according to a compensation amount of leakage current. Accordingly, the resistance value ratios of the resistances may not be used particularly but another resistance value may be used.

Thus, a balance among voltages applied to the respective capacitors C1 to C3 can be maintained in an effective state when the resistances R4 to R7 connected to the collectors or emitters of the transistors Tr1 to Tr4 are set at the resistance values correspondingly proportional to the resistance values of the corresponding groups of resistances. In this case, electric current is supplied through the emitter-collector path of the transistor Tr2 so that the voltage at the node N3 substantially corresponds with the voltage at the node N5, so that the voltage at the node N3 can be controlled so as to substantially correspond with the voltage at the node N5.

Conversely, when the capacitor C1 has a smaller leakage current than the other capacitors C2 and C3, the terminal voltage $V_1$ of the capacitor C1 becomes larger than the terminal voltages $V_2$ and $V_3$ of the respective capacitors C2 and C3. The voltage at the node N3 then drops below a normal value $2 \times V_0/3$. The voltages at the nodes N5 and N6 become divided voltages ($2 \times V_0/3$ and $V_0/3$) of the resistances R1 to R3 respectively. Accordingly, since the voltage at the node N5 becomes higher than the voltage at the node N3, the base current flows into the transistor Tr1, which is turned on. Current is supplied from the node N1 via the resistance R4 to the node N3.

In the above-described case, the resistance R4 is set at a resistance value correspondingly proportional to the resistance of one (that is, resistance R1) of three resistances R1 to R3. Furthermore, the resistance R5 is set at a resistance value correspondingly proportional to two (that is, resistances R2 and R3) of three resistances R1 to R3. More specifically, when the resistance R4 is set at 200 [kΩ], the resistance R5 is set at 400 [kΩ]. Accordingly, electric current is supplied to the collector-emitter path of the transistor Tr1 so that the voltage at the node N3 substantially corresponds with the voltage at the node N5. Even when any one of the leakage currents of the main circuit capacitors C1 to C3 differs, the voltage stabilization circuits 72 and 73 are provided in the respective groups (k=2 and k=3), with the result that voltage unbalance can be resolved according to the same operation as described above.

Figure 2:
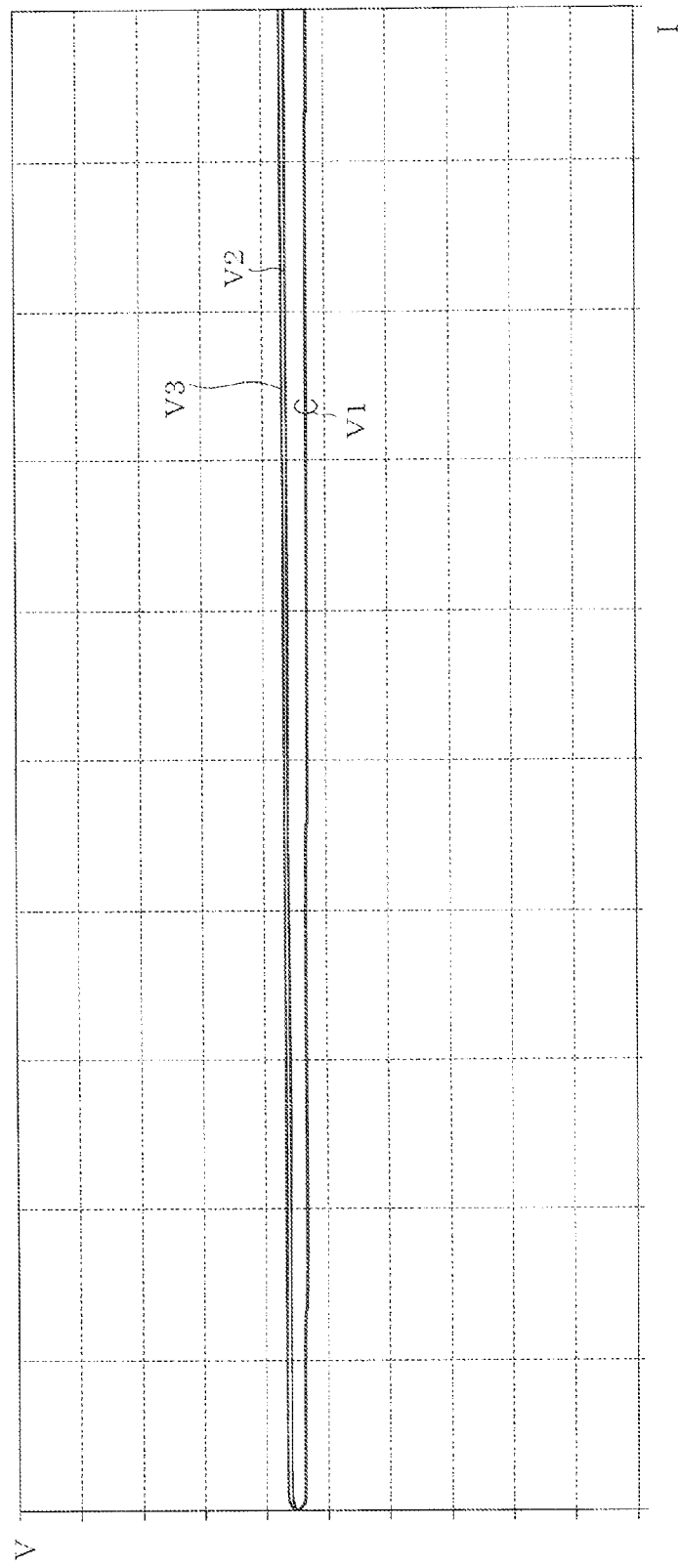
FIG. 2 is a graph showing terminal voltage characteristics of main circuit capacitors according to leakage current in the first embodiment.

The inventors simulated terminal voltages of the capacitors C1 to C3, leakage current I and characteristics of current flowing into the resistance R5 (during ON of the transistor Tr2) when leakage current of the capacitor C1 is larger than leakage currents of the other capacitors C2 and C3. FIG. 2 is a graph showing characteristics of terminal voltages of the capacitors according to respective leakage currents. FIGS. 3A to 3D show characteristics of currents flowing into the resistances R4, R5, R6 and R7 according to the leakage currents respectively. The vertical axis of the graph of FIG. 2 represents an inter-terminal voltage of each capacitor and the horizontal axis represents leakage current assumed to be generated in the capacitor C1. FIGS. 2 and 3A to 3D show the results of simulation in the case where leakage currents flowing through the respective capacitors C2 and C3 are 0.

Figure 3A:
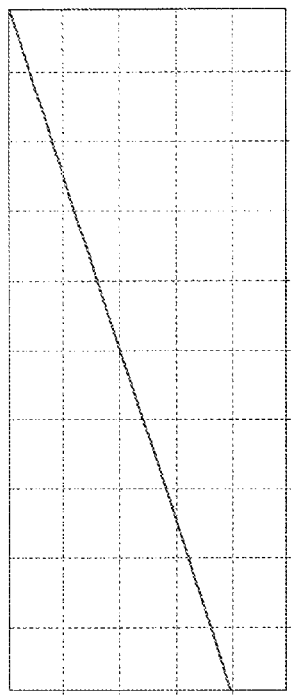
FIGS. 3A to 3D are graphs showing characteristics of current flowing into respective resistances according to leakage current in the first embodiment.
Figure 3B:
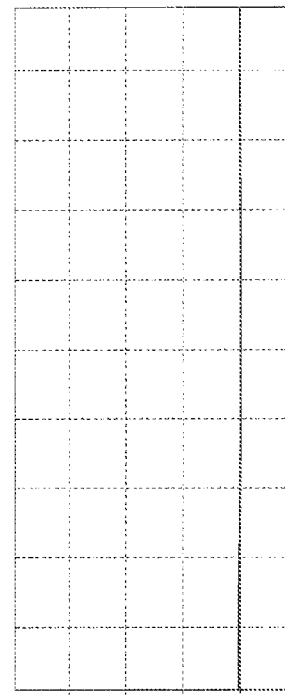
Figure 3C:
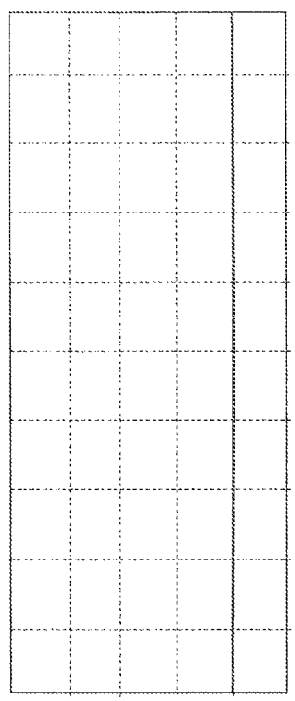
Figure 3D:
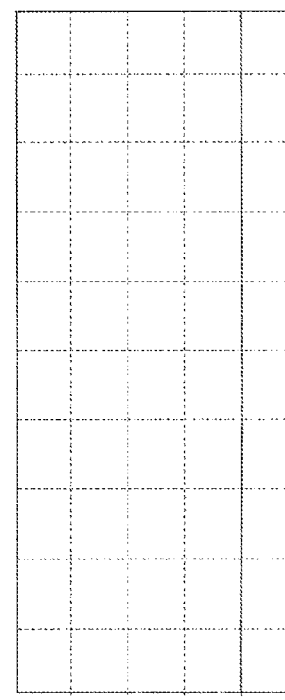

FIG. 3B shows that current proportional to the leakage current I flows into the resistance R5. The voltage at the node N3 is raised by this action, approximating to the normal value $2 \times V_0/3$.

Although the leakage currents of the capacitors C2 and C3 are assumed to be zero in the example as shown in FIG. 2, the terminal voltage $V_1$ of the capacitor C1 drops below the terminal voltages $V_2$ and $V_3$ of the other capacitors C2 and C3 when the leakage current I of the capacitor C1 is larger than those of the other capacitors C2 and C3, as shown in FIG. 2. However, the voltage balance can be rendered as favorable as possible since the terminal voltages $V_2$ and $V_3$ of the capacitors C2 and C3 can be substantially equal to each other. Moreover, the differences between the maximum values and the minimum values of the terminal voltages $V_1$ to $V_3$ of the capacitors C1 to C3 become smaller in the embodiment than in a second embodiment which will be described later. Accordingly, the voltage balance in the embodiment can be rendered more favorable than in the second embodiment.

According to the above-described embodiment, the first main power supply line N1 serves as a common source node of the voltage stabilization circuits 72 and 73, and the second main power supply line N2 serves as the common destination node of the voltage stabilization circuits 72 and 73. The voltage stabilization circuits 72 and 73 which are connected to the respective common connection nodes N3 and N4 control the voltages at the nodes N3 and N4 so that the voltages are approximated to the respective normal values, $2 \times V_0/3$ and $V_0/3$, respectively. Accordingly, the voltages of the common connection nodes N3 and N4 of all the main circuit capacitors C1 to C3 can be approximated to the divided voltage, whereby the voltage unbalance can be resolved as much as possible.

Furthermore, when no voltage imbalance is caused, the transistors Tr1 to Tr4 are each maintained in the OFF state. Accordingly, since the resistances R4 to R7 do not result in power loss, electrical power consumption can be reduced. Consequently, the differences among leakage currents among the capacitors C1 to C3 can be compensated.

FIGS. 4 to 6D illustrate a second embodiment. The second embodiment differs from the first embodiment in that the destination node of the voltage stabilization circuit 72 has been changed to the third output node N4 and the source node of the voltage stabilization circuit 73 has been changed to the second output node N3. The second embodiment is directed to a combination of voltage stabilization circuits configured to meet the condition, (n, k, a, b)=(3, 2, 1, 1) and (n, k, a, b)=(3, 3, 1, 1) respectively. Identical or similar parts in the second embodiment are labeled by the same reference symbols as those in the first embodiment and the description of these parts will be eliminated. Only the difference between the first and second embodiments will be described.

Figure 4:
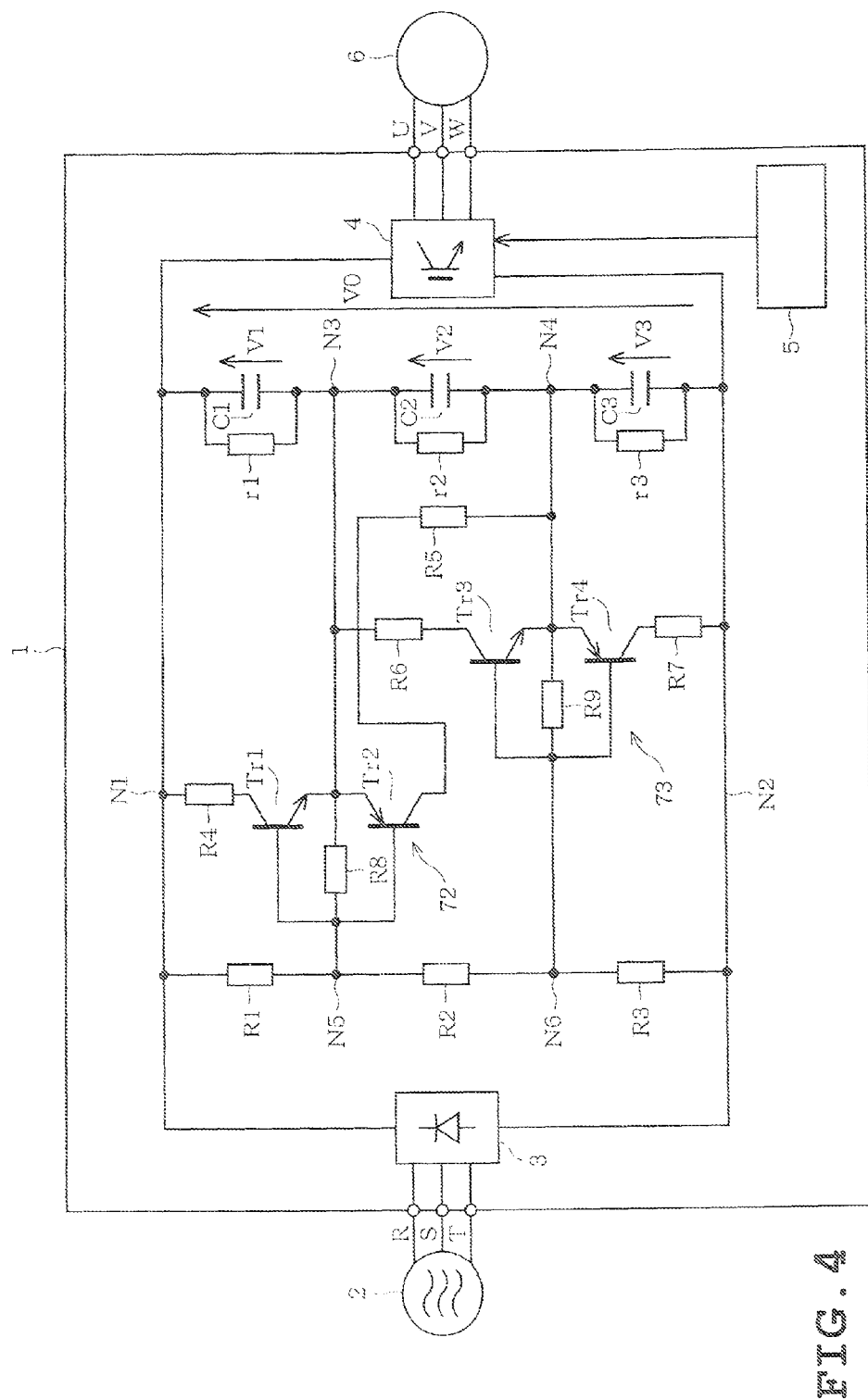
FIG. 4 is a view similar to FIG. 1, showing an electrical arrangement of the inverter device according to a second embodiment.

In the first embodiment, the second main power supply line N2 (the (n+1)-th output node) serves as the destination node and is connected via the resistance R5 to the emitter of the transistor Tr2 in the voltage stabilization circuit 72. The first main power supply line N1 (the first output node) serves as the source node and is connected via the resistance R6 to the collector of the transistor Tr3. In the second embodiment, as shown in FIG. 4, a node N4 (a third output node) serves as a destination node and is connected via the resistance R5 to the collector of the transistor Tr2 in the voltage stabilization circuit 72. A node N3 (a second output node) serves as a source node and is connected via the resistance R6 to the collector of the transistor Tr3. This circuit arrangement differs from that in the first embodiment in that voltage is balanced between the capacitors C1 and C2 and between the capacitors C2 and C3.

FIGS. 5 and 6A to 6D show characteristics corresponding to FIGS. 2 and 3A to 3D respectively. In particular, the vertical axis in FIG. 5 designates an inter-terminal voltage V of each capacitor and the horizontal axis designates a leakage current I assumed to occur in the capacitor C1. FIGS. 5 and 6A to 6D show the results of simulation carried out under the condition where leakage current flowing into each of the capacitors C2 and C3 is zero.

Figure 5:
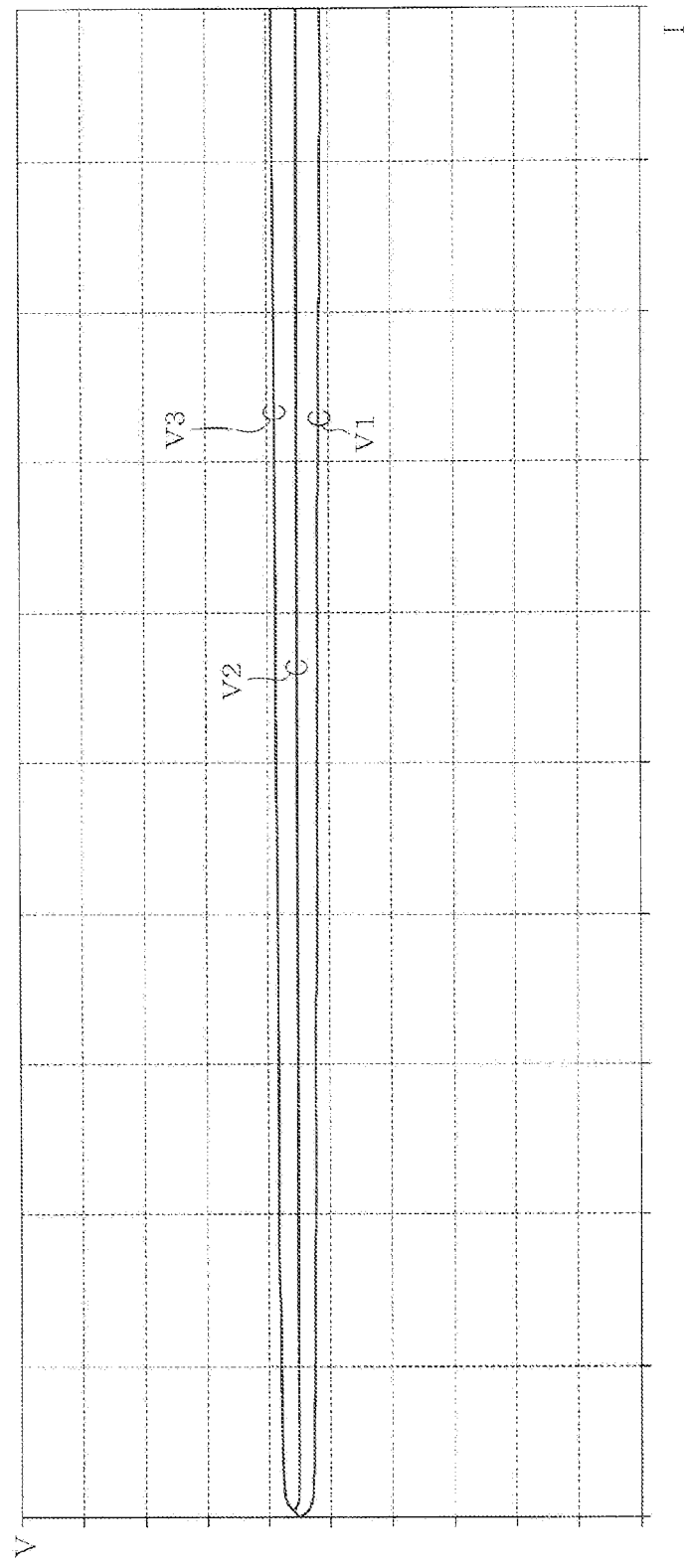
FIG. 5 is a graph similar to FIG. 2, showing the terminal voltage characteristics in the second embodiment.
Figure 6A:
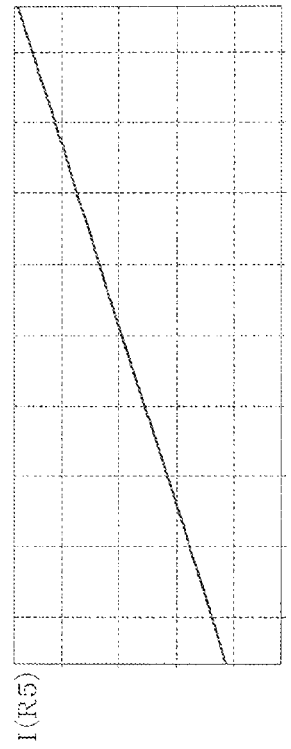
FIGS. 6A to 6D are graphs similar to FIGS. 3A to 3D, showing the current characteristics in the second embodiment.
Figure 6B:
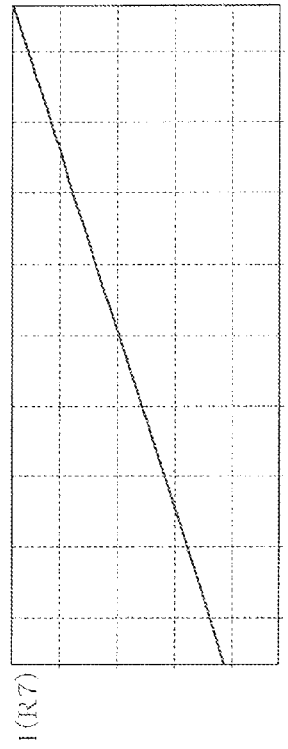
Figure 6C:
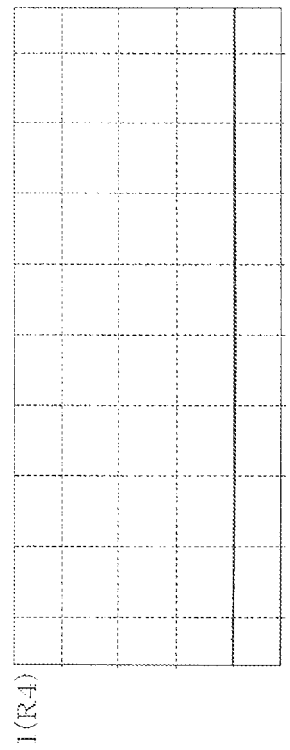
Figure 6D:
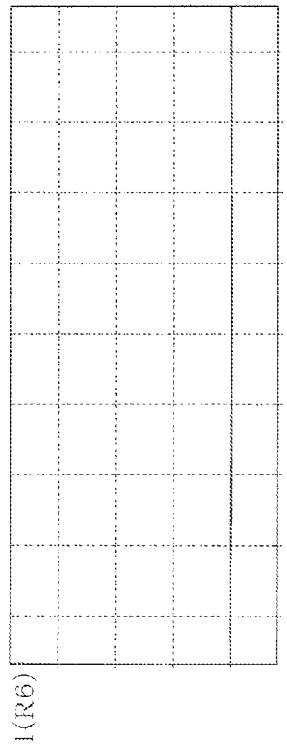

Although leakage current flowing through each of the capacitors C2 and C3 is assumed to be zero in the example shown in FIG. 5, terminal voltages of the capacitors C1, C2 and C3 are rendered larger in the sequence of $V_1$, $V_2$ and $V_3$ when the leakage current of the capacitor C1 is large as shown in FIG. 5. The voltage balance between the capacitors C1 and C2 and the voltage balance between the C2 and C3 can be improved in the second embodiment. However, the voltage balance between the capacitors C1 and C3 in the first embodiment is better than that in the second embodiment.

A rectified and smoothed voltage $V_0$ is applied between the first and second main power supply lines N1 and N2. In the second embodiment, the voltage $V_0$ is divided into three parts and a device having the divided voltage with voltage margin as a breakdown voltage can be used as each transistor (Tr1, Tr2 and Tr3).

In the first embodiment, each one of the transistors Tr2 and Tr3 has a collector-emitter breakdown voltage obtained by providing one group of voltage of two resistances (two-thirds of voltage $V_0$) with voltage margin. On the other hand, voltage obtained by providing voltage of one resistance with voltage margin can be used as the breakdown voltage in the second embodiment. Thus, a device having breakdown voltage which is as low as possible can be used as each one of the capacitors C1 to C3. Consequently, the second embodiment can provide a circuit arrangement advantageous in the costs.

Furthermore, electric current is also supplied through the resistance R7 (see FIG. 6D) as shown in FIGS. 6A to 6d. This occurs when an increase in the electrical potential of the node N4 turns on the transistor Tr4. In the first embodiment, the terminal voltages V2 and V3 of the respective capacitors C2 and C3 are substantially at the same voltage as shown in FIG. 2. In the second embodiment, however, the terminal voltage V3 of the capacitor C3 is higher than the terminal voltage V2 of the capacitor C2 as shown in FIG. 5. Accordingly, the electrical potential at the node N4 is easy to increase and the transistor Tr4 is turned on. The potential at the node N4 can be controlled so as to drop by turning on the transistor Tr4. Even when the inverter device is wire connected in the above-described manner, the second embodiment can achieve the same operation and advantageous effect as the first embodiment.

Figure 7:
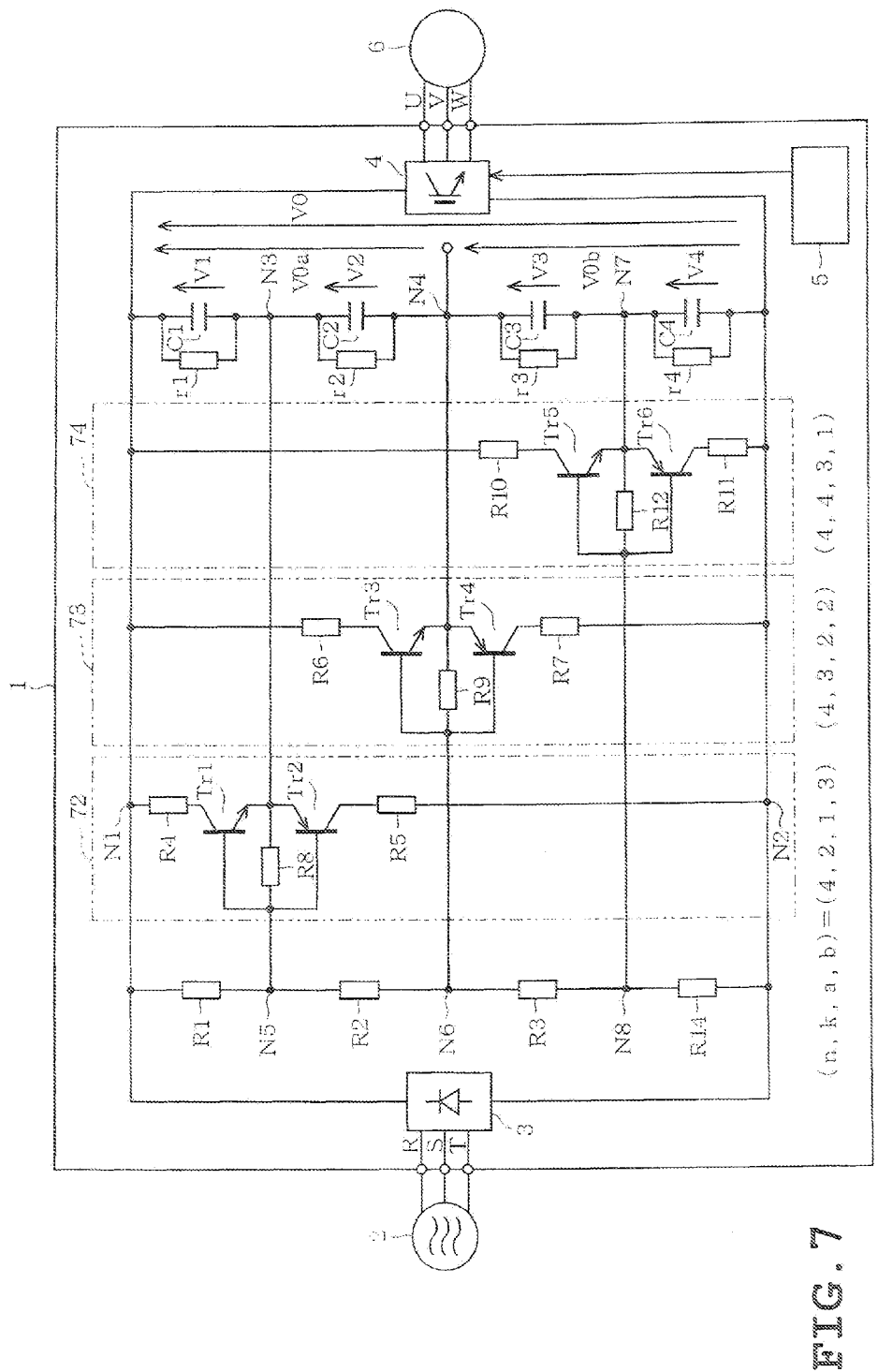
FIG. 7 is a view similar to FIG. 1, showing an electrical arrangement of the inverter device according to a third embodiment.
Figure 8A:
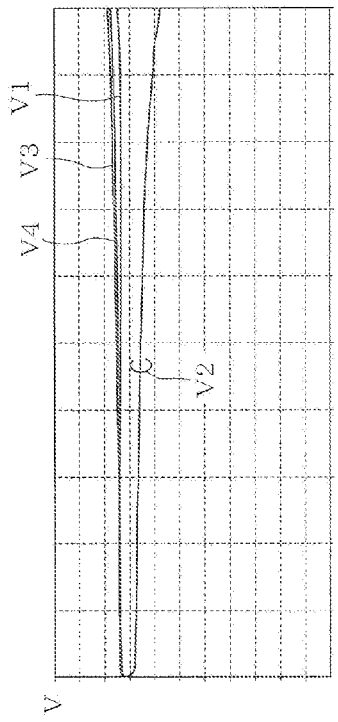
FIGS. 8A to 8D are graphs similar to FIG. 2, showing the terminal voltage characteristics in the third embodiment.
Figure 8B:
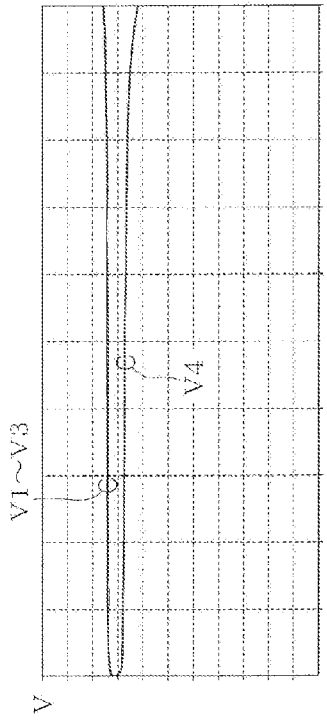
Figure 8C:
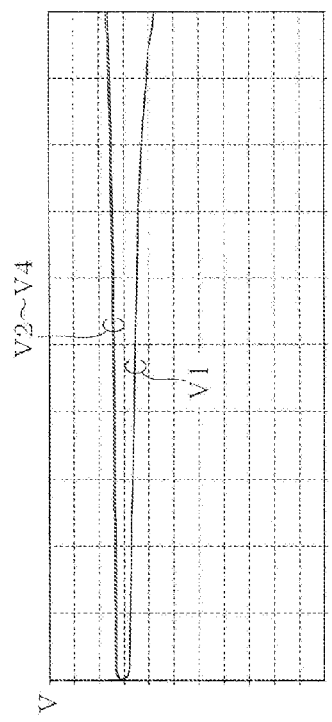
Figure 8D:
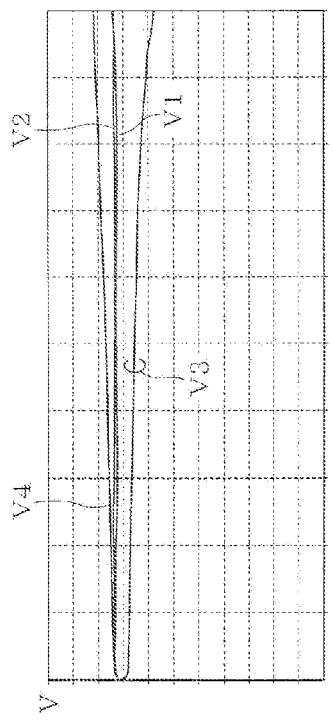

FIGS. 7 to 8D illustrate a third embodiment. The third embodiment differs from the first and second embodiments in that even-numbered main circuit capacitors C1 to C4 are connected in series to one another so that voltages $V_0a$ (=$V_1$+$V_2$) and $V_0b$ (=$V_3$+$V_4$) each of which is one half of the maximum DC voltage are obtained. Identical or similar parts in the third embodiment are labeled by the same reference symbols as those in the first and second embodiments and the description of these parts will be eliminated. Only the difference between the first and second embodiments and the third embodiment will be described.

The third embodiment is directed to a combination of voltage stabilization circuits 72, 73 and 74 configured to meet the conditions, (n, k, a, b)=(4, 2, 1, 3), (4, 3, 2, 2) and (4, 4, 3, 1) respectively. The combination of (n, k, a, b) should not be limited to those described above and particularly, the combination of "a" and "b" should not be limited to those described above.

In the inverter device 1, an intermediate voltage of the DC voltage is sometimes obtained according to the type thereof to be used. Accordingly, the even-numbered (four, for example) capacitors C1 to C4 are series-connected, and divided voltages of the same number of capacitors C1 and C2 and of the same number of capacitors C3 and C4 between the high-voltage side first main power supply line N1 and the low-voltage side second main power supply line N2. As a result, the voltage $V_0a$ (=$V_1$+$V_2$) of the series circuit of the capacitors C1 and C2 or the voltage $V_0b$ (=$V_3$+$V_4$) of the series circuit of the capacitors C3 and C4 is obtained, whereby one half of the DC voltage between the first and second main power supply lines N1 and N2 can be supplied.

In the above-described case, even-numbered resistances R1 to R3 and R14 (four (=n), in the embodiment) are series-connected between the first and second main power supply lines N1 and N2, and even-numbered capacitors C1 to C4 (four, in the embodiment) are series-connected between the first and second main power supply lines N1 and N2, as shown in FIG. 7. Reference symbols r1 to r4 designate internal resistances of the capacitors C1 to C4 in FIG. 7.

The voltage stabilization circuits 72, 73 and 74 are provided in the embodiment as shown in FIG. 7. The voltage stabilization circuit 72 includes the transistors Tr1 and Tr2. The voltage stabilization circuit 73 includes the transistors Tr3 and Tr4. Furthermore, the voltage stabilization circuit 74 includes the NPN transistor Tr5 and the PNP transistor Tr6 both of which are connected so as to have a common base and a common emitter.

The resistance R4 connected to the collector of the transistor Tr1 is further connected to the first main power supply line N1 (the first output node) as a source node. The resistance R6 connected to the collector of the transistor Tr3 is also connected to the first main power supply line N1 as a source node. In the same manner, a resistance R10 connected to the transistor Tr5 is also connected to the first main power supply line N1 as a source node.

Furthermore, the resistance R5 connected to the collector of the transistor Tr2 is further connected to the second main power supply line N2 (a fifth output node) as a destination node. The resistance R7 connected to the collector of the transistor Tr4 is also connected the second main power supply line N2 as the destination node. Still furthermore, a resistance R11 connected to the collector of the transistor Tr6 is further connected to the second main power supply line N2 as the destination node. A resistance R12 is connected between the common base and the common emitter of the transistor Tr5 and Tr6.

The resistance R5 is set at a resistance value correspondingly proportional to a resistance value of three of four groups of resistances R1 to R3 and R14. The resistance R4 is set at a resistance value correspondingly proportional to one group of resistance value. In other words, a ratio of the resistance value of the resistance R4 to the resistance value of the resistance R5 is set to 1:3.

The resistance R6 has a resistance value set so as to be correspondingly proportional to a resistance value of two of the four groups of resistances R1 to R3 and R14. The resistance R7 also has a resistance value set so as to be correspondingly proportional to the resistance value of two of the four groups of resistances. More specifically, the resistance values of the resistances R6 and R7 are set in ratios of 2:2=1:1.

The resistance R10 has a resistance value set so as to be correspondingly proportional to a resistance value of three of the four groups of resistances R1 to R3 and R14. The resistance R11 also has a resistance value set so as to be correspondingly proportional to the resistance value of one of the four groups of resistances. More specifically, the resistance values of the resistances R10 and R11 are set in ratio of 3:1. The voltage stabilization circuit 72 is configured into the arrangement corresponding to the combination of condition (n, k, a, b)=(4, 2, 1, 3). The voltage stabilization circuit 73 is configured into the arrangement corresponding to the combination of condition (n, k, a, b)=(4, 3, 2, 2). The voltage stabilization circuit 74 is configured into the arrangement corresponding to the combination of (n, k, a, b)=(4, 4, 3, 1).

The inventors conducted simulation of the terminal voltages $V_1$ to $V_4$ of the respective capacitors C1 to C4. FIGS. 8A, 8B, 8C and 8D show the results of simulation in the case where an amount of leakage current of the capacitor C1 is larger, the case where an amount of leakage current of the capacitor C2 is larger, a case where an amount of leakage current of the capacitor C3 is larger and a case where an amount of leakage current of the capacitor C4 is larger, respectively. In each of FIGS. 8A to 8D, amounts of leakage current of the capacitors except for the target capacitor having a larger amount of leakage current are each assumed to be set at 0. In the case shown in FIG. 8A, for example, amounts of leakage current of the capacitors C2 to C4 except for the target capacitor C1 are each assumed to be set at 0.

In the four patterns, the terminal voltage $V_1$ of the capacitor C1 is especially lower and the terminal voltages V2 to V4 of the respective capacitors C2 to C4 are substantially equivalent in the case of FIG. 8A. In the case of FIG. 8B, terminal voltages are presented in the relationship of $V_2<V_1<V_3\approx V_4$. FIG. 8B thus shows that the terminal voltages have high or low levels. In the case of FIG. 8C, terminal voltages are presented in the relationship of $V_3<V_1\approx V_2<V_4$. FIG. 8C also shows that the terminal voltages have high or low levels. In the case of FIG. 8D, terminal voltages are presented in the relationship of $V_4<V_1\approx V_2\approx V_3$. FIG. 8D further shows that the terminal voltages have high or low levels. More specifically, the terminal voltage of the capacitor having a larger amount of leakage current becomes lower while the terminal voltages of the other capacitors become higher.

When the potential at the node N3 is higher than the potential at the node N5, the transistor Tr2 is turned on, whereby the potential at the node N3 is controlled to become lower so that the potential at the node N3 substantially corresponds with the potential at the node N5. In contrast with this, when the potential at the node N3 is lower than the potential at the node N5, the transistor Tr1 is turned on, whereby the potential at the node N3 is controlled to become higher so that the potential at the node N3 substantially corresponds with the potential at the node N5.

In the similar manner, when the potential at the node N4 is higher than the potential at the node N6, the transistor Tr4 is turned on, whereby the potential at the node N4 is controlled to become lower so that the potential at the node N4 substantially corresponds with the potential at the node N6. In contrast with this, when the potential at the node N4 is lower than the potential at the node N6, the transistor Tr3 is turned on, whereby the potential at the node N4 is controlled to become higher so that the potential at the node N4 substantially corresponds with the potential at the node N6.

Still furthermore, when the potential at the common connection node N7 of the capacitors C3 and C4 is higher than the potential at the common connection node N8 of the resistances R3 and R14, the transistor Tr6 is turned on, whereby the potential at the node N7 is controlled to substantially correspond with the potential at the node N8. In contrast with this, when the potential at the node N7 is lower than the potential at the node N8, the transistor Tr5 is turned on, whereby the potential at the node N7 is controlled to become higher so that the potential at the node N8 substantially corresponds with the potential at the node N8. Thus, voltage balance can be achieved in the similar manner to that in the first embodiment.

Figure 9:
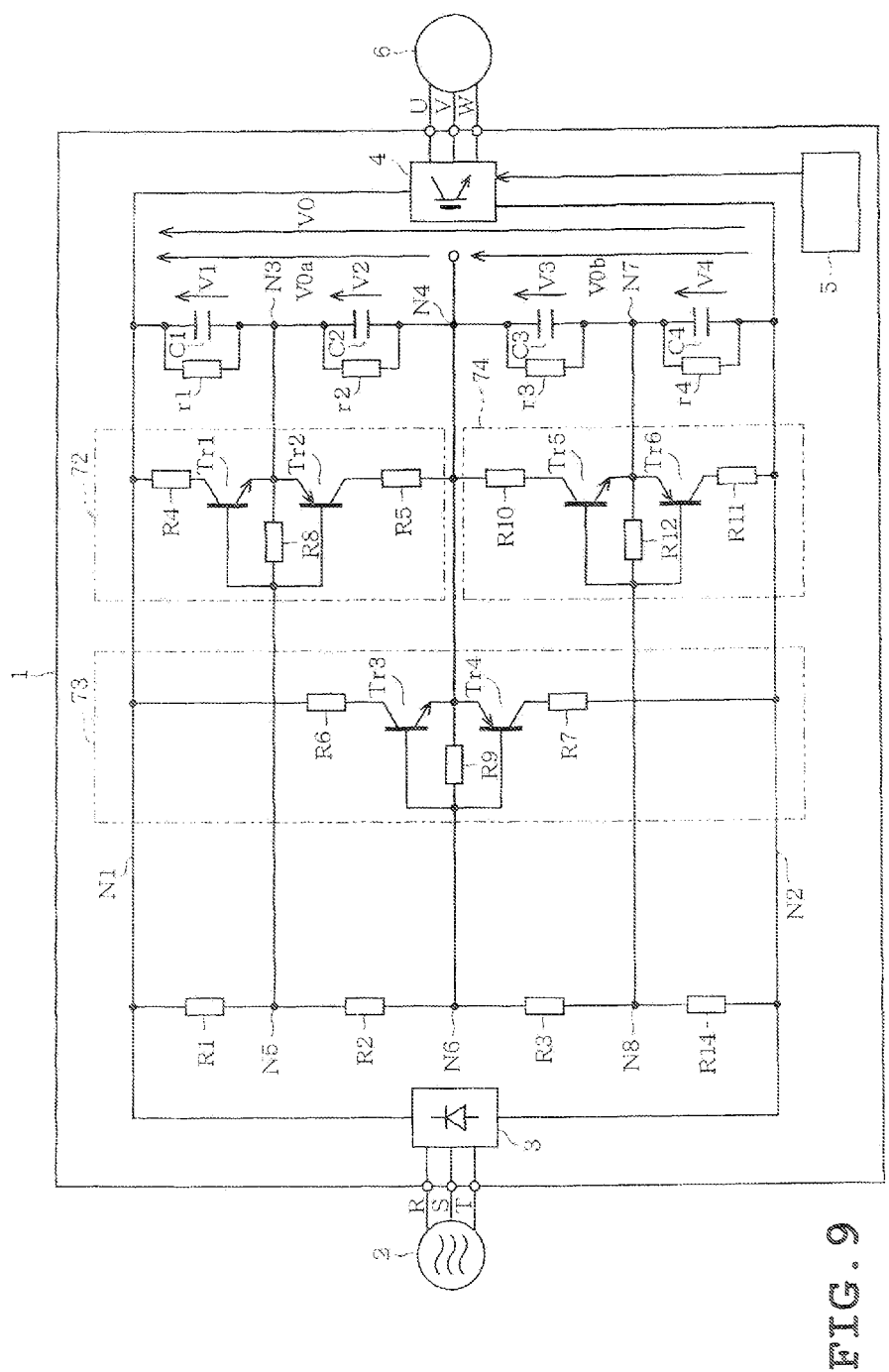
FIG. 9 is a view similar to FIG. 1, showing the inverter device according to a fourth embodiment.
Figure 10A:
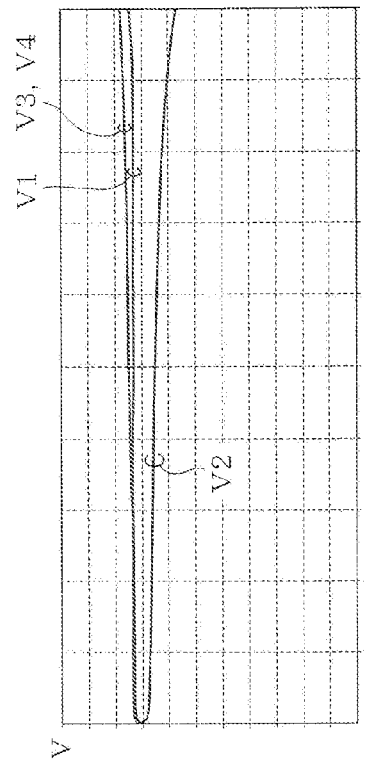
FIGS. 10A to 10D are graphs similar to FIG. 2, showing the terminal voltage characteristics in the fourth embodiment.
Figure 10B:
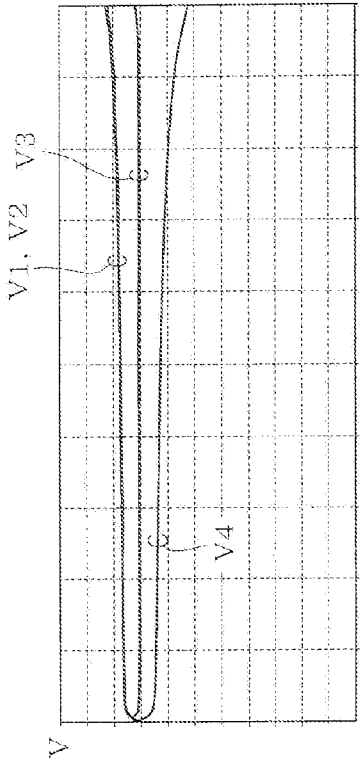
Figure 10C:
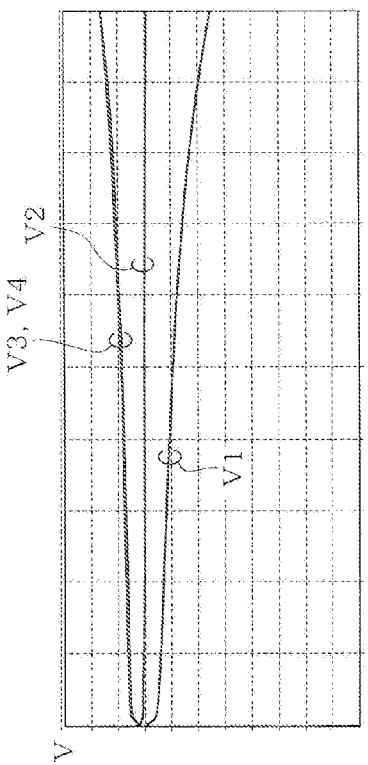
Figure 10D:
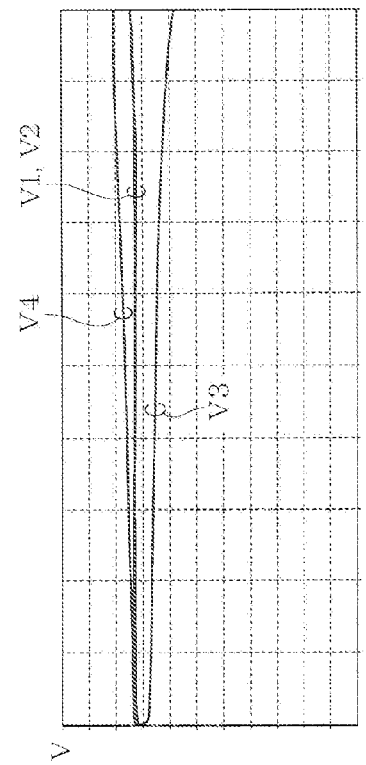

FIGS. 9 to 10D illustrate a fourth embodiment. The fourth embodiment differs from the first to third embodiments in that the source node and the destination node have been changed. The fourth embodiment is directed to a combination of voltage stabilization circuits 72, 73 and 74 configured to meet the conditions, (n, k, a, b)=(4, 2, 1, 1), (4, 3, 2, 2) and (4, 4, 1, 1) respectively. In the fourth embodiment, as shown in FIG. 9, the voltage stabilization circuit 72 in which k=2 includes the destination node of the resistance R5 which is connected to the collector of the transistor Tr2 and serves as the node 4 (the third output node (b=1). Furthermore, the voltage stabilization circuit 74 includes the source node of the resistance R10 which is connected to the collector of the transistor Tr5 and serves as the source node N4 (the third output node (a=1)).

FIGS. 10A, 10B, 10C and 10D show the results of simulation in the case where the capacitor C1 has a larger amount of leakage current, the case where the capacitor C2 has a larger amount of leakage current, the case where the capacitor C3 has a larger amount of leakage current and the case where the capacitor C4 has a larger amount of leakage current, respectively. In each of FIGS. 10A to 10D, amounts of leakage current of the capacitors except for the target capacitor having a larger amount of leakage current are each assumed to be set at 0. In FIG. 10A, for example, amounts of leakage current of the capacitors C2 to C4 except for the target capacitor C1 are each assumed to be set at 0.

In the case of FIG. 10A, the terminal voltage $V_1$ of the capacitor C1 is particularly low and the terminal voltage $V_2$ of the capacitor C2 is higher than the terminal voltage $V_1$. The terminal voltages $V_3$ and $V_4$ of the capacitors C3 and C4 are substantially equal to each other and are higher than the terminal voltage $V_2$. In the case of FIG. 10B, terminal voltages are presented in the relationship of $V_2<V_1<V_3\approx V_4$. In the case of FIG. 10C, terminal voltages are presented in the relationship of $V_3<V_1\leq V_2<V_4$. In the case of FIG. 10D, terminal voltages are presented in the relationship of $V_4<V_3<V_1\approx V_2$. The terminal voltage of the capacitor having a larger amount of leakage current becomes lower while the terminal voltages of the other capacitors become higher in the same manner as in the foregoing embodiments. Consequently, the fourth embodiment can achieve the same operation and advantageous effect as the foregoing embodiments.

Figure 11:
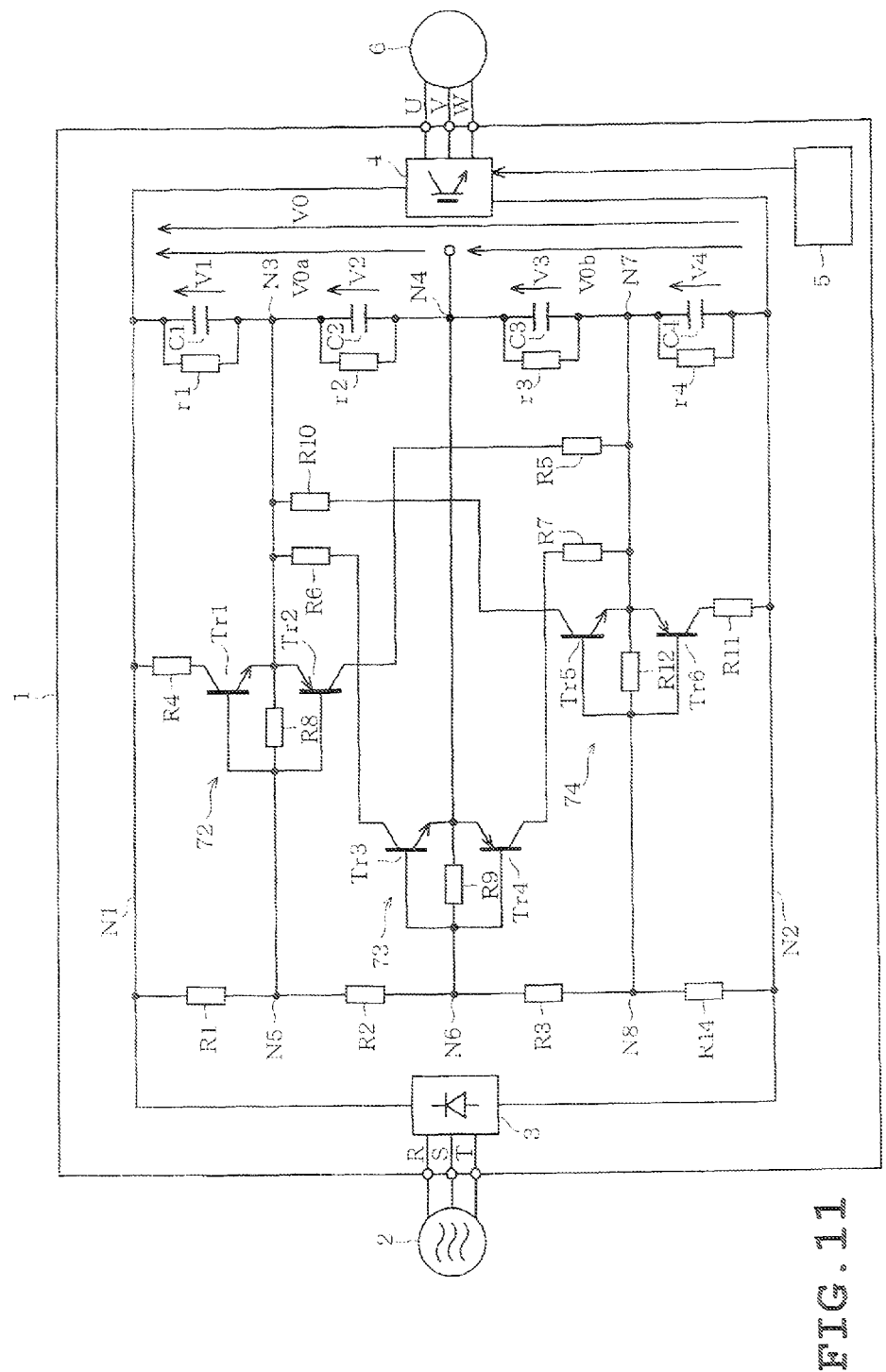
FIG. 11 is a view similar to FIG. 1, showing the inverter device according to a fifth embodiment.
Figure 12A:
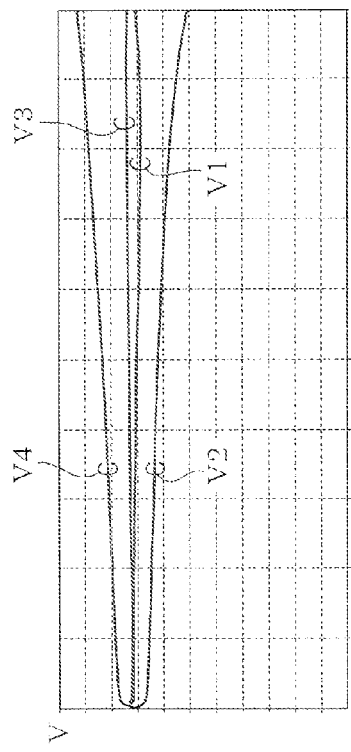
FIGS. 12A to 12D are graphs similar to FIG. 2, showing the terminal voltage characteristics in the fifth embodiment.
Figure 12B:
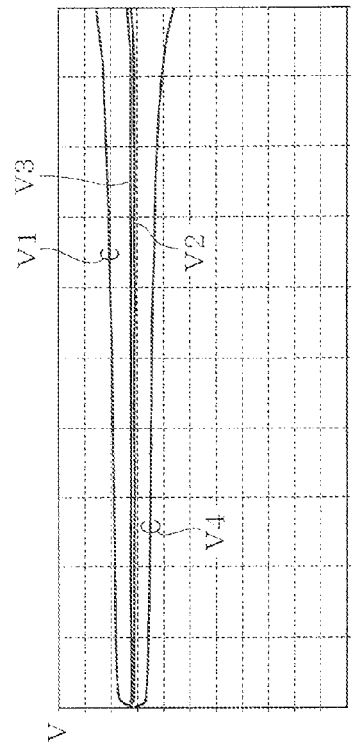
Figure 12C:
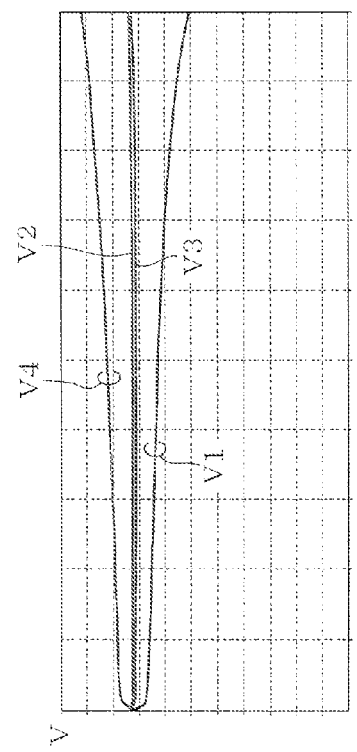
Figure 12D:
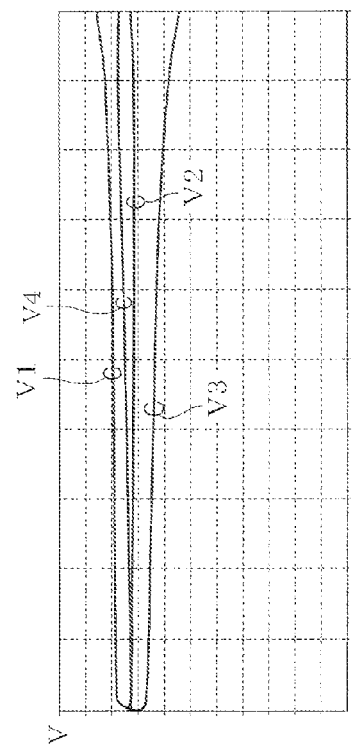

FIGS. 11 to 12D illustrate a fifth embodiment. The fifth embodiment differs from the first to fourth embodiments in that the source node and the destination node have been changed. The fifth embodiment is directed to a combination of voltage stabilization circuits 72, 73 and 74 configured to meet the conditions, (n, k, a, b)=(4, 2, 1, 2), (4, 3, 1, 1) and (4, 4, 2, 1) respectively. In the fifth embodiment, as shown in FIG. 11, the voltage stabilization circuit 72 includes a source node of the resistance R4 which is connected to the collector of the transistor Tr1 and serves as the first main power supply line N1 (the first output node). The voltage stabilization circuit 72 also includes a destination node of the resistance R5 which is connected to the collector of the transistor Tr2 and serves as a node N7 (a fourth output node).

The voltage stabilization circuit 73 includes a source node of the resistance RE which is connected to the collector of the transistor Tr3 and serves as the node N3 (the second output node). The voltage stabilization circuit 73 also includes a destination node of the resistance R7 which is connected to the collector of the transistor Tr4 and serves as the node N7 (the fourth output node). Furthermore, the voltage stabilization circuit 74 includes a source node of the resistance R10 which is connected to the collector of the transistor Tr5 and serves as the node N3 (the second output node). The voltage stabilization circuit 74 also includes a destination node of the resistance R11 which is connected to the collector of the transistor Tr6 and serves as the second main power supply line N2 (a fifth output node).

The inventors simulated terminal voltages $V_1$ to $V_4$ of the capacitors C1 to C4. FIGS. 12A, 12B, 12C and 12D show the results of simulation in the case where the capacitor C1 has a larger amount of leakage current, the case where the capacitor C2 has a larger amount of leakage current, the case where the capacitor C3 has a larger amount of leakage current and the case where the capacitor C4 has a larger amount of leakage current, respectively. In each of FIGS. 12A to 12D, amounts of leakage current of the capacitors except for the target capacitor having a larger amount of leakage current are each assumed to be set at 0. In FIG. 12A, for example, amounts of leakage current of the capacitors C2 to C4 except for the target capacitor C1 are each assumed to be set at 0.

In the case of FIG. 12A, the terminal voltage $V_1$ of the capacitor C1 is particularly low and the terminal voltages $V_3$ and $V_2$ of the capacitors C3 and C2 are higher than the terminal voltage $V_1$. The terminal voltage $V_4$ of the capacitor C4 is higher than the terminal voltages $V_3$ and $V_2$. In the case of FIG. 12B, terminal voltages are presented in the relationship of $V_2<V_1\approx V_3<V_4$. In the case of FIG. 12C, terminal voltages are presented in the relationship of $V_3<V_2<V_4<V_1$. In the case of FIG. 12D, terminal voltages are presented in the relationship of $V_4<V_2\approx V_3<V_1$. The terminal voltage of the capacitor having a larger amount of leakage current becomes lower while the terminal voltages of the other capacitors become higher, in the same manner as in the foregoing embodiments. Consequently, the fifth embodiment can achieve the same operation and advantageous effect as the foregoing embodiments.

Figure 13:
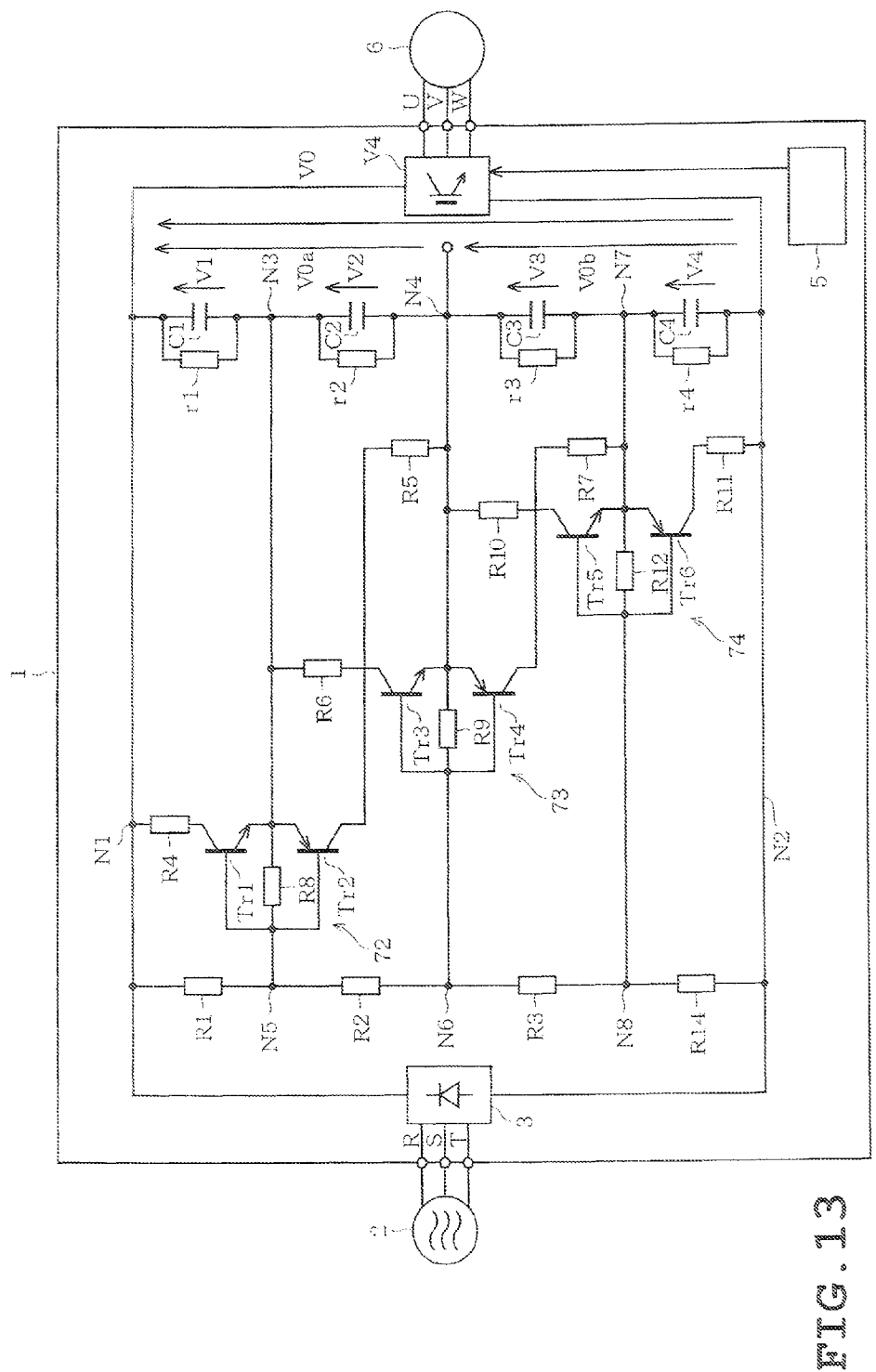
FIG. 13 is a view similar to FIG. 1, showing the inverter device according to a sixth embodiment.
Figure 14B:
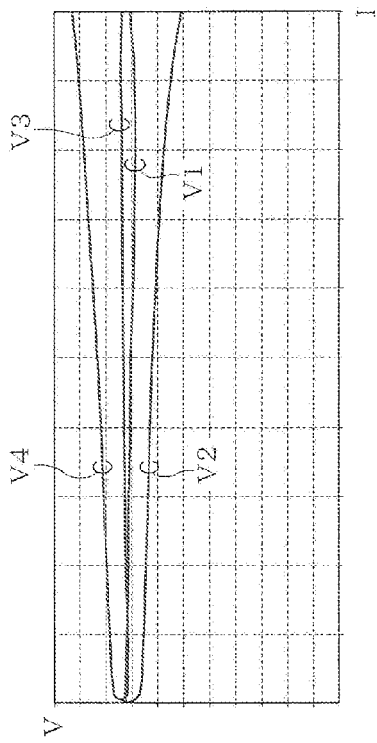
FIGS. 14A to 14D are graphs similar to FIG. 2, showing the terminal voltage characteristics in the sixth embodiment.
Figure 14D:
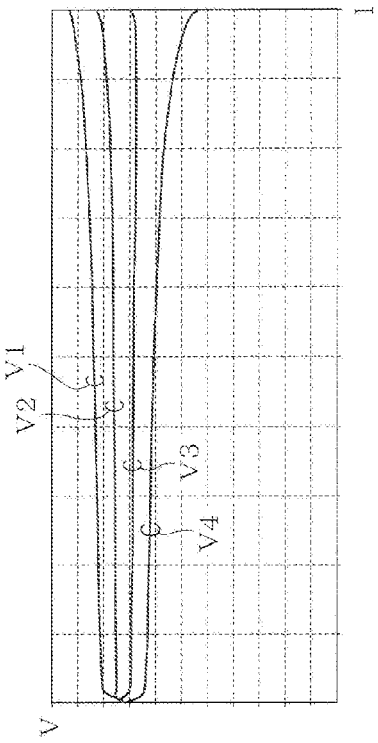

FIGS. 13 to 14D illustrate a sixth embodiment. The sixth embodiment differs from the first to fifth embodiments in that the source node and the destination node have been changed. The sixth embodiment is directed to a combination of voltage stabilization circuits 72, 73 and 74 configured to meet the conditions, (n, k, a, b)=(4, 2, 1, 1), (4, 3, 1, 1) and (4, 4, 1, 1) respectively. In the sixth embodiment, as shown in FIG. 13, the voltage stabilization circuit 72 includes a source node of the resistance R4 which is connected to the collector of the transistor Tr1 and serves as the first main power supply line N1 (the first output node). The voltage stabilization circuit 72 also includes a destination node of the resistance R5 which is connected to the collector of the transistor Tr2 and serves as a node N4 (a third output node).

The voltage stabilization circuit 73 includes a source node of the resistance R6 which is connected to the collector of the transistor Tr3 and serves as the node N3 (the second output node). The voltage stabilization circuit 73 also includes a destination node of the resistance R7 which is connected to the collector of the transistor Tr4 and serves as the node N7 (the fourth output node). Furthermore, the voltage stabilization circuit 74 includes a source node of the resistance R10 which is connected to the collector of the transistor Tr5 and serves as the node N4 (the third output node). The voltage stabilization circuit 74 also includes a destination node of the resistance R11 which is connected to the collector of the transistor Tr6 and serves as the second main power supply line N2 (a fifth output node).

Figure 14A:
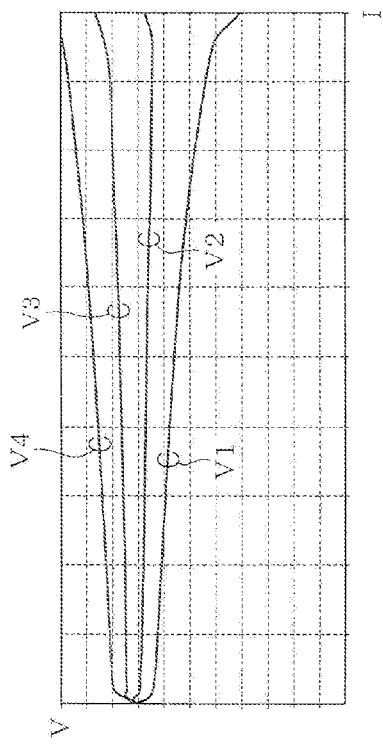

The inventors simulated terminal voltages $V_1$ to $V_4$ of the capacitors C1 to C4. FIGS. 14A, 14B, 14C and 14D show the results of simulation in the case where the capacitor C1 has a larger amount of leakage current, the case where the capacitor C2 has a larger amount of leakage current, the case where the capacitor C3 has a larger amount of leakage current and the case where the capacitor C4 has a larger amount of leakage current, respectively. In each of FIGS. 14A to 14D, amounts of leakage current of the capacitors except for the target capacitor having a larger amount of leakage current are each assumed to be set at 0. In FIG. 14A, for example, amounts of leakage current of the capacitors C2 to C4 except for the target capacitor C1 are each assumed to be set at 0.

Figure 14C:
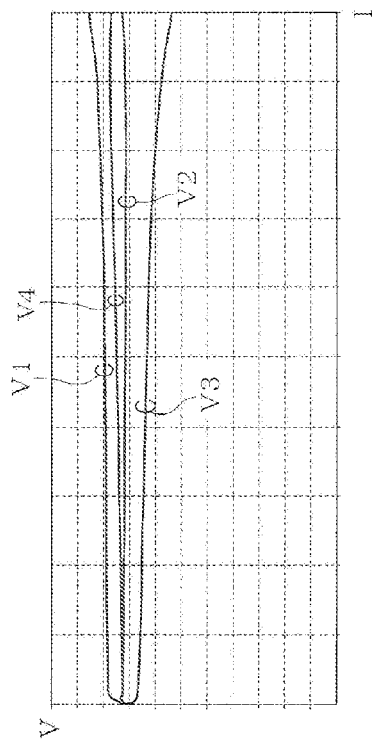

In the case of FIG. 14A, the terminal voltage $V_1$ of the capacitor C1 is particularly low and the terminal voltages $V_2$, $V_3$ and $V_4$ of the capacitors C2, C3 and C4 are sequentially higher than the terminal voltage $V_1$ in this order. In the case of FIG. 14B, terminal voltages are presented in the relationship of $V_2<V_1\approx V_3<V_4$. In the case of FIG. 14C, terminal voltages are presented in the relationship of $V_3<V_2<V_4<V_1$. In the case of FIG. 14D, terminal voltages are presented in the relationship of $V_4<V_3<V_2<V_1$. The terminal voltage of the capacitor having a larger amount of leakage current becomes lower while the terminal voltages of the other capacitors become higher, in the same manner as in the foregoing embodiments. Consequently, the sixth embodiment can achieve the same operation and advantageous effect as the foregoing embodiments.

The following will describe the results of comparison of the circuit configurations of the third to sixth embodiments. Comparisons were made among the results of simulation of terminal voltages $V_1$ to $V_4$ of the respective capacitors C1 to C4. The comparisons show that voltage difference according to a leakage current (the difference between the maximum and the minimum of terminal voltage corresponding to a leakage current value) tends to become smaller in the sequence of the third embodiment (FIGS. 7 and 8A to 8D), the fourth embodiment (FIGS. 9 and 10A to 10D), the fifth embodiment (FIGS. 11 and 12A to 12D) and the sixth embodiment (FIGS. 13 and 14A to 14D). More specifically, the circuit configuration of the third embodiment (FIG. 7) has a smallest difference between the maximum value and the minimum value of terminal voltages $V_1$ to $V_4$ of the respective capacitors C1 to C4 even when an amount of leakage current is increased. Conversely, the circuit configuration of the sixth embodiment (FIG. 13) has a largest difference.

More specifically, the circuit configuration of the third embodiment (FIG. 7) indicates a highest performance of the third to sixth embodiments. The fourth and fifth embodiments (FIGS. 9 and 11) indicate second and third highest performances respectively and the sixth embodiment (FIG. 13) indicates a lowest performance of the four embodiments.

On the other hand, the collector-emitter breakdown voltage of each one of the transistors Tr1 to Tr6 composing the voltage stabilization circuits 72, 73 and 74 is set so as to correspond to the voltage of the number of groups between the source and destination nodes. Accordingly, the transistor Tr2 is set at a collector-emitter breakdown voltage corresponding to three groups of DC voltage applied to four groups of resistances R1 to R3 and R14 in the third embodiment (FIG. 7). Similarly, each of the transistors Tr3 and Tr4 is set at a collector-emitter breakdown voltage corresponding to two groups of DC voltage applied to four groups of resistances R1 to R3 and R14. Furthermore, the transistor Tr5 is set at a collector-emitter breakdown voltage corresponding to three groups of DC voltage applied to four groups of resistances R1 to R3 and R14.

On the other hand, in the fourth embodiment (FIG. 9), each of the transistors Tr3 and Tr4 is set at a collector-emitter breakdown voltage corresponding to two groups of DC voltage applied to four groups of resistances R1 to R3 and R14. In the fifth embodiment (FIG. 11), each of the transistors Tr2 and Tr5 is set at a collector-emitter breakdown voltage corresponding to two groups of DC voltage applied to four groups of resistances R1 to R3 and R14. Furthermore, in the sixth embodiment (FIG. 13), each one of the transistors Tr1 to Tr6 merely requires a collector-emitter breakdown voltage corresponding to one group of DC voltage applied to the resistances R1 to R3 and R14. Thus, the sixth embodiment presents a most advantageous circuit configuration since the circuit can be composed of transistors each of which has a lower collector-emitter breakdown voltage.

More specifically, the circuit of the sixth embodiment (FIG. 13) can be composed of transistors each of which has a lowest collector-emitter breakdown voltage of the third to sixth embodiments. The collector-emitter breakdown voltage becomes higher in the sequence of the circuits of the fifth (FIG. 11), fourth (FIG. 9) and third (FIG. 7) embodiments. Using transistors each of which has a lower collector-emitter breakdown voltage is advantageous in costs. More specifically, the circuit configuration of the sixth embodiment (FIG. 13) is most advantageous of those of the third to sixth embodiments. Although any one of the circuit configurations of the third to sixth embodiments may be used, it is desirable to configure a circuit by trade-off between voltage balance performance and the collector-emitter breakdown voltages of transistors.

The foregoing embodiments should not be restrictive but may be modified or expanded as follows. The combination of the condition (n, k, a, b) should not be limited to those employed in the foregoing embodiments. For example, a voltage stabilization circuit configured on the basis of a combination of the condition (n, k, a, b) as shown in FIG. 15. More specifically, each of the first and second embodiments employs the voltage stabilization circuits in the case where n=3. Each of the third to sixth embodiments employs the voltage stabilization circuits in the case where n=4. However, a case where n≥5 may be applicable.

The resistance R8 is connected between the common base and the common emitter between the transistors Tr1 and Tr2. The resistance R9 is connected between the common base and the common emitter between the transistors Tr3 and Tr4. The resistance R12 is connected between the common base and the common emitter between the transistors Tr5 and Tr6. However, the resistances R8, R9 and R12 may be provided as needed.

In the foregoing embodiments, the resistances connected to the collectors of the transistors Tr1 to Tr6 are set at the resistance values correspondingly proportional to the numbers of groups of the resistances R1 to R3 and R14. However, when variations in element values, design values and the like are considered, the resistances may not be strictly set at the respective exemplified resistance values but may be changed to appropriate values.

As obvious from the foregoing description, all the embodiments achieve the following advantageous effects. The voltage between the main terminals is divided by n-number of groups of resistances and also by n-number of groups of main circuit capacitors. However, since each main circuit capacitor causes leakage current, the divided voltage fluctuates. An (n−1)-number of voltage stabilization circuits each include the first and second transistors. The (k−a)-th output node serving as the source node is connected via the first resistance correspondingly proportional to, for example, a-number of groups and the first transistor to the output terminals of the first and second transistors.

Accordingly, when the voltage of the k-th reference node of the n-number of resistances is higher than the voltage at the k-th output node of n-number of main circuit capacitors, electric power is supplied from the (k−a)-th output node via the first transistor to the output terminal side of the first transistor, whereupon the voltage of the k-th output node of the main circuit capacitor connected to the output terminal can be controlled to be increased.

On the contrary, the (k+b)-th output node serving as the destination node is connected to the output terminals of the first and second transistors via the second resistance correspondingly proportional to, for example, b-number of resistances and via the second transistor. Accordingly, when the voltage at the k-th reference node of n-number of resistances is lower than the voltage at the k-th output node of n-number of main circuit capacitors, electric current is supplied from the output terminal via the second transistor to the (k+b)-th output node, whereupon the voltage at the k-th output node of the main circuit capacitor connected to the output terminal can be controlled to be reduced.

Since the k-th (2≤k≤n) voltage stabilization circuit can stabilize the voltage at the k-th output node into the normal voltage, the voltages at the common connection nodes of all the main circuit capacitors can be stabilized so as to be approximated to the normal values. Consequently, unbalance among the terminal voltages of all the main circuit capacitors can be resolved as much as possible as compared with the conventional technique in which voltage balance is not carried out among a plurality of pairs of main circuit capacitors although voltage balance is carried out between a pair of adjacent main circuit capacitors.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A voltage balancing circuit comprising:

n-number of groups of resistances series-connected between a high voltage side first reference node and a low voltage side (n+1)-th reference node, between first and second main terminals to which DC voltage is supplied, where $n \geq 3$;

n-number of groups of main circuit capacitors series-connected between the high voltage side first output node and the low voltage side (n+1)-th output node between the first and second main terminals supplying DC voltage;

(n−1)-number of voltage stabilization circuits configured between k-th reference nodes of the n-number of groups of resistances and k-th output nodes of the n-number of groups of main circuit capacitors respectively where $2 \leq k \leq n$, each voltage stabilization circuit including first and second transistors of first and second conductivity types opposed to each other, respectively and having commonly connected reference input terminals and commonly connected output terminals, the reference input terminals being connected to the k-th reference nodes of the n-number of groups of main circuit capacitors, the output terminals being connected to the k-th output nodes of the n-number of groups of main circuit capacitors, wherein when voltage of each reference input terminal is higher than voltage of each output terminal, power is supplied from a source node via the first transistor to the output terminal, and when the voltage of each reference input terminal is lower than the voltage of each output terminal, power is supplied from the output terminal via the second transistor to a destination node, whereby the voltage of the output terminal is stabilized so as to correspond with the voltage of the reference input terminal; and wherein the k-th voltage stabilization circuit is configured in such a manner that the first transistor is connected via a first resistance to a (k−a)-th output node serving as the source node and the second transistor is connected via a second resistance further connected to a (k+b)-th output node serving as the destination node, where $2 \leq k \leq n$, $1 \leq a \leq k-1$ and $1 \leq b \leq n+1-k$.

2. The voltage balancing circuit according to claim 1, wherein three groups of the resistances and three groups of the main circuit capacitors are provided and the (n−1)-number (=2) of voltage stabilization circuits are configured so as to meet conditions, (n, k, a, b)=(3, 2, 1, 2) and (n, k, a, b)=(3, 3, 2, 1) respectively.

3. The voltage balancing circuit according to claim 1, wherein three groups of the resistances and three groups of the main circuit capacitors are provided and the (n−1)-number (=2) of voltage stabilization circuits are configured so as to meet conditions, (n, k, a, b)=(3, 2, 1, 1) and (n, k, a, b)=(3, 3, 1, 1) respectively.

4. The voltage balancing circuit according to claim 1, wherein four groups of the resistances and four groups of the main circuit capacitors are provided and the (n−1)-number (=3) of voltage stabilization circuits are configured so as to meet conditions, (n, k, a, b)=(4, 2, 1, 3), (n, k, a, b)=(4, 3, 2, 2) and (n, k, a, b)=(4, 4, 3, 1) respectively.

5. The voltage balancing circuit according to claim 1, wherein four groups of the resistances and four groups of the main circuit capacitors are provided and the (n−1)-number (=3) of voltage stabilization circuits are configured so as to meet conditions, (n, k, a, b)=(4, 2, 1, 1), (n, k, a, b)=(4, 3, 2, 2) and (n, k, a, b)=(4, 4, 1, 1) respectively.

6. The voltage balancing circuit according to claim 1, wherein four groups of the resistances and four groups of the main circuit capacitors are provided and the (n−1)-number (=3) of voltage stabilization circuits are configured so as to meet conditions, (n, k, a, b)=(4, 2, 1, 2), (n, k, a, b)=(4, 3, 1, 1) and (n, k, a, b)=(4, 4, 2, 1) respectively.

7. The voltage balancing circuit according to claim 1, wherein four groups of the resistances and four groups of the main circuit capacitors are provided and the (n−1)-number (=3) of voltage stabilization circuits are configured so as to meet conditions, (n, k, a, b)=(4, 2, 1, 1), (n, k, a, b)=(4, 3, 1, 1) and (n, k, a, b)=(4, 4, 1, 1) respectively.

8. The voltage balancing circuit according to claim 1, wherein the first resistance is set at a resistance value that is correspondingly proportional to a resistance value of a-number of the n-number of groups of resistances, and the second resistance is set at a resistance value that is correspondingly proportional to a resistance value of b-number of the n-number of groups of resistances.

* * * * *